United States Patent
Choi et al.

(10) Patent No.: US 11,034,811 B2
(45) Date of Patent: Jun. 15, 2021

(54) RESIN COMPOSITION AND MOLDED ARTICLE PRODUCED THEREFROM

(71) Applicant: Lotte Advanced Materials Co., Ltd., Yeosu-si (KR)

(72) Inventors: Kihong Choi, Uiwang-si (KR); Taegon Kang, Uiwang-si (KR); Seungshik Shin, Uiwang-si (KR); Dongin Ha, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 8 days.

(21) Appl. No.: 16/473,323

(22) PCT Filed: Nov. 22, 2017

(86) PCT No.: PCT/KR2017/013305
§ 371 (c)(1),
(2) Date: Jun. 25, 2019

(87) PCT Pub. No.: WO2018/124482
PCT Pub. Date: Jul. 5, 2018

(65) Prior Publication Data
US 2019/0352483 A1    Nov. 21, 2019

(30) Foreign Application Priority Data
Dec. 27, 2016  (KR) .................. 10-2016-0180295

(51) Int. Cl.
| C08J 9/06 | (2006.01) |
| C08J 9/00 | (2006.01) |
| C08L 69/00 | (2006.01) |
| H01B 1/24 | (2006.01) |

(52) U.S. Cl.
CPC ........... *C08J 9/0095* (2013.01); *C08J 9/0061* (2013.01); *C08J 9/06* (2013.01); *C08L 69/00* (2013.01); *H01B 1/24* (2013.01); *C08J 2369/00* (2013.01); *C08J 2451/04* (2013.01); *C08L 2201/02* (2013.01); *C08L 2203/20* (2013.01)

(58) Field of Classification Search
CPC ...... C08L 69/00; C08L 55/02; C08L 2666/24; C08L 2201/02; C08L 2203/20; C08L 25/10; C08L 27/18; C08K 3/04; C08K 2003/267; C08K 3/34; C08K 5/523; C08K 9/04; C08J 2203/02; C08J 2369/00; C08J 2427/18; C08J 2451/04; C08J 2455/02; C08J 9/0038; C08J 9/0061; C08J 9/0066; C08J 9/0076; C08J 9/0085; C08J 9/0095; C08J 9/06; C08J 9/08
See application file for complete search history.

(56) References Cited

U.S. PATENT DOCUMENTS

| 6,998,434 | B2 | 2/2006 | Wadahara et al. |
| 8,324,307 | B2 | 12/2012 | Harder et al. |
| 8,969,448 | B2 | 3/2015 | Eckel et al. |
| 9,567,222 | B2 | 2/2017 | Jung et al. |
| 2004/0077771 | A1 | 4/2004 | Wadahara et al. |
| 2006/0004154 | A1* | 1/2006 | DeRudder ............... C08L 53/00 525/469 |
| 2007/0072960 | A1 | 3/2007 | Ma et al. |
| 2014/0093712 | A1* | 4/2014 | Tong ........................ C08K 7/06 428/220 |
| 2014/0187702 | A1 | 7/2014 | Lee et al. |
| 2014/0234629 | A1* | 8/2014 | Sun ......................... C08L 69/00 428/412 |
| 2014/0275366 | A1 | 9/2014 | Chirino et al. |
| 2016/0263840 | A1 | 9/2016 | Choi et al. |
| 2017/0058105 | A1 | 3/2017 | Geng et al. |

FOREIGN PATENT DOCUMENTS

| EP | 1367097 A1 | 12/2003 |
| JP | 2009-510220 A | 3/2009 |
| JP | 2014-159510 A | 9/2014 |
| KR | 10-1999-0047019 A | 7/1999 |
| KR | 10-0649503 B1 | 11/2006 |
| KR | 10-1132225 B1 | 2/2009 |
| KR | 10-1470524 B1 | 1/2011 |
| KR | 10-1113948 B1 | 5/2011 |
| KR | 10-2012-0046557 A | 5/2012 |
| KR | 10-1355386 B1 | 8/2013 |
| KR | 10-2015-0013582 A | 2/2015 |
| KR | 10-1654405 B1 | 6/2015 |
| WO | 2015/081031 A1 | 6/2015 |
| WO | 20161132337 A1 | 8/2016 |
| WO | 20181124482 A2 | 7/2018 |

OTHER PUBLICATIONS

International Search Report in counterpart International Application No. PCT/KR2017/013305 dated Feb. 19, 2018, pp. 1-3.
Extended Search Report in counterpart European Application No. 17888629.7 dated Jun. 12, 2020, pp. 1-6.

* cited by examiner

Primary Examiner — Mark Kopec
Assistant Examiner — Jaison P Thomas
(74) *Attorney, Agent, or Firm* — Additon, Pendleton & Witherspoon, P.A.

(57) ABSTRACT

Provided are resin composition and a molded article produced therefrom, the resin composition comprising: a polycarbonate resin; a rubber-modified aromatic vinyl-based copolymer resin; a conductive additive including a carbon fiber and a carbon nanotube; talc; and a foaming agent, wherein the carbon fiber and the carbon nanotube are contained in a weight ratio of 1:0.1 to 1:0.4.

10 Claims, No Drawings

RESIN COMPOSITION AND MOLDED ARTICLE PRODUCED THEREFROM

CROSS-REFERENCE TO RELATED APPLICATIONS

This application claims priority to and the benefit of International Application No. PCT/KR2017/013305, filed Nov. 22, 2017, which published as WO 2018/124482 on Jul. 5, 2018; and Korean Patent Application No. 10-2016-0180295, filed in the Korean Intellectual Property Office on Dec. 27, 2016, the entire disclosure of each of which is incorporated herein by reference.

TECHNICAL FIELD

A resin composition and a molded article produced therefrom are disclosed.

BACKGROUND ART

A polycarbonate resin has excellent impact strength, heat resistance, dimensional stability, and weather resistance and is applied to various fields of household products, office automation equipment, electric and electron products, and the like. In addition, various types of fillers may be added to enhance various properties. These polycarbonate resins have electromagnetic wave shield performance by applying electrical conductivity according to the types and characteristics of the products used, and thereby there are many attempts to use them for automobiles, various electric devices, household appliances such as TV, and the like, electron assemblies, or cables.

However, a molded article made from the polycarbonate resin is very useful as an electric insulator because its electrical resistance is very high in its characteristics. However, since this high electrical resistance deepens static electricity generation caused by friction, and thus electronic circuits housed therein may be directly damaged. Therefore, a plastic material used in the housing of a very precise electric/electronic device needs to have excellent antistatic performance, that is, conductivity.

In order to prevent this problem, conventionally, a method of protecting circuits by attaching a conductive tape of a metallic material to a casing formed from a polycarbonate resin or the like or coating a metal on one surface of a casing is grounded.

However, there is drawback that coating of the conductive tape or the metal is expensive and it is difficult to form effective thin film. Therefore, a resin composition has been developed by mixing a conductive filler such as carbon black, a carbon fiber, a carbon nanotube, a metal powder, a metal coating inorganic powder or a metal fiber, and the like with a resin composition of the polycarbonate resin and endowing electrical conductivity to the thermoplastic resin.

However, a large amount of conductive filler is required to achieve the desired electrical conductivity in the conductivity material. When a large amount of conductive filler is used, impact strength, elongation, and flame retardancy of a molded article produced therefrom may be deteriorated and the overall mechanical properties may also be deteriorated.

DISCLOSURE

Technical Problem

An embodiment provides a resin composition having improved conductivity and flame retardancy.

Another embodiment provides a molded article produced from the resin composition.

Technical Solution

An embodiment provides a resin composition including a base resin comprising: a polycarbonate resin, a rubber-modified aromatic vinyl-based copolymer resin, a conductive additive including a carbon fiber and a carbon nanotube, and talc; and a foaming agent, wherein the carbon fiber and the carbon nanotube are contained in a weight ratio of 1:0.1 to 1:0.4.

The foaming agent may be included in an amount of 0.5 to 5 parts by weight based on 100 parts by weight of the resin composition.

1 to 10 wt % of the talc may be included based on a total weight of the resin composition.

The resin composition may further include a phosphorus-based flame retardant and a flame retardant auxiliary agent.

The phosphorus-based flame retardant may be included in an amount of 5 to 20 wt % based on a total weight of the resin composition.

The flame retardant auxiliary agent may be polytetrafluoroethylene.

The flame retardant auxiliary agent may be included in an amount of 0.2 to 2 parts by weight based on 100 parts by weight of the resin composition.

In another embodiment, a molded article produced from the resin composition is provided.

The molded article may have a sheet resistance of less than or equal to $10^5$ Ohm/sq.

The molded article may have flame retardancy of greater than or equal to V-1 according to UL94 standard.

Advantageous Effects

The resin composition according to an embodiment exhibits high conductivity even though a small amount of conductive additives are introduced, and has a high conductivity without deteriorating flame retardancy by additionally introducing a foaming agent.

MODE FOR INVENTION

Hereinafter, embodiments of the present invention are described in detail. However, these embodiments are exemplary, the present invention is not limited thereto and the present invention is defined by the scope of claims.

Hereinafter, a resin composition according to an embodiment is described in more detail.

A resin composition according to an embodiment of the present invention includes a base resin comprising: a polycarbonate resin, a rubber-modified aromatic vinyl-based copolymer resin, a conductive additive including a carbon fiber and a carbon nanotube, and talc; and a foaming agent, wherein the carbon fiber and the carbon nanotube have a weight ratio of 1:0.1 to 1:0.4.

In general, a conductive additive such as carbon black, a carbon fiber, a carbon nanotube, and the like is added to a polycarbonate resin having insulation property to impart conductivity thereto but causes a problem of overall increasing a price of the resin due to its high price and deteriorating flame retardancy.

However, the resin composition according to an embodiment includes the carbon fiber and the carbon nanotube as the conductive additive in an appropriate content and thus may have economic feasibility as well as secure excellent conductivity and in addition, further includes a foaming agent and thus may realize high flame retardancy.

Hereinafter, each component of the resin composition will be described in more detail.

Polycarbonate Resin

A polycarbonate resin according to an embodiment may be prepared by reacting diphenols represented by Chemical Formula 1 with phosgene, halogenic acid ester, carbonate ester, or a combination thereof.

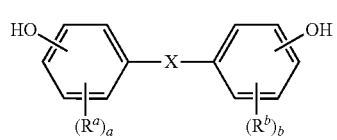

[Chemical Formula 1]

In Chemical Formula 1,

X is selected from a single bond, a substituted or unsubstituted C1 to C5 alkylene, a substituted or unsubstituted C1 to C5 alkylidene, a substituted or unsubstituted C3 to C6 cycloalkylene, a substituted or unsubstituted C5 to C6 cycloalkylidene, —CO, S, and $SO_2$, $R^a$ and $R^b$ are independently a substituted or unsubstituted C1 to C30 alkyl group or a substituted or unsubstituted C6 to C30 aryl group, and a and b are independently 0 to 4.

For example, two or more kinds of the diphenols represented by Chemical Formula 1 may be combined to constitute a repeating unit of a polycarbonate resin. For example, the diphenols may be 4,4'-dihydroxydiphenyl, 2,2-bis(4-hydroxyphenyl)propane (referred to as 'bisphenol-A'), 2,4-bis(4-hydroxyphenyl)-2-methylbutane, bis(4-hydroxyphenyl)methane, 1,1-bis(4-hydroxyphenyl)cyclohexane, 2,2-bis(3-chloro-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulfoxide, bis(4-hydroxyphenyl)ketone, bis(4-hydroxyphenyl)ether, and the like. Among the diphenols, for example, 2,2-bis(4-hydroxyphenyl)propane, 2,2-bis(3,5-dichloro-4-hydroxyphenyl)propane or 1,1-bis(4-hydroxyphenyl)cyclohexane may be used. For example, the polycarbonate resin may be 2,2-bis(4-hydroxyphenyl)propane that is bisphenol-A.

For example, the polycarbonate resin may be a linear polycarbonate resin, branched polycarbonate resin, or a polyestercarbonate copolymer resin. For example, a weight average molecular weight of the polycarbonate resin may be 10,000 to 100,000 g/mol, for example, 15,000 to 50,000 g/mol, but is not limited thereto. For example, at least two types of polycarbonate resins having a different weight average molecular weight (Mw) may be mixed in order to satisfy desired fluidity.

The polycarbonate resin may be included in an amount of 50 to 90 wt %, for example, 50 to 80 wt %, for example, 50 to 75 wt %, for example, 55 to 75 wt %, for example, 60 to 75 wt %, for example, 60 to 70 wt % based on a total amount of the resin composition. When the polycarbonate resin is included within the ranges, a resin composition having improved mechanical properties such as excellent hardness and impact strength, and the like is provided.

Rubber-Modified Aromatic Vinyl-Based Copolymer Resin

The resin composition according to an embodiment includes a rubber-modified aromatic vinyl-based copolymer resin. The rubber-modified aromatic vinyl-based copolymer resin may be a rubbery polymer selected from a butadiene rubber, a styrene/butadiene rubber, an acrylonitrile/butadiene rubber, an isoprene rubber, an ethylene/propylene rubber, an ethylene-propylene-diene terpolymer (EPDM) rubber, and a polyorganosiloxane/polyalkyl(meth)acrylate rubber which is grafted with an aromatic vinyl-based monomer and a monomer copolymerizable with the aromatic vinyl-based monomer.

For example, an amount of the rubbery polymer may be 5 to 65 wt %, for example 10 to 60 wt %, or specifically 20 to 50 wt % based on a total weight (100 wt %) of the rubber-modified aromatic vinyl-based copolymer resin. When the rubbery polymer satisfies the amount ranges, impact resistance, mechanical properties, and the like of the resin composition may be improved.

An average particle diameter of the rubbery polymer may range from 0.1 to 10 μm in order to improve impact resistance and surface characteristics of a molded article using the same. For example, the average particle diameter of the rubbery polymer may range from 0.15 to 6 μm, for example, 0.15 to 4 μm, or for example, 0.25 to 3.5 μm. Within the ranges, the resin composition may ensure excellent impact strength.

The aromatic vinyl-based monomer may be graft-copolymerized on the rubbery copolymer and may be for example, styrene, styrene substituted with a C1 to C10 alkyl group, halogen substituted styrene, or a combination thereof. For example, the aromatic vinyl-based monomer may be o-ethyl styrene, m-ethyl styrene, p-ethyl styrene, α-methyl styrene, and the like, but is not limited thereto, and may be used alone or in a mixture of two or more.

An amount of the aromatic vinyl-based monomer may be 15 to 94 wt %, for example, 20 to 80 wt %, or for example, 30 to 60 wt % based on a total weight of the rubber-modified aromatic vinyl-based copolymer resin. When the aromatic vinyl-based monomer satisfies the amount ranges, impact resistance, mechanical properties, and the like may be improved.

The monomer copolymerizable with the aromatic vinyl-based monomer may be for example a vinyl cyanide-based monomer such as acrylonitrile, methacrylonitrile, ethacrylonitrile, phenylacrylonitrile, α-chloroacrylonitrile, fumaronitrile, and the like, and may be used alone or in a mixture of two or more.

An amount of the vinyl cyanide-based monomer may be 1 to 20 wt %, for example 5 to 15 wt % based on a total weight of the rubber-modified aromatic vinyl-based copolymer resin. When the vinyl cyanide-based monomer is included within the ranges, excellent impact resistance and heat resistance may be obtained.

For example, the rubber modified vinyl-based copolymer resin prepared by the above method may be an acrylonitrile-butadiene-styrene (ABS) copolymer resin.

An amount of the rubber modified vinyl-based copolymer resin may be 1 to 10 wt %, for example, 1 to 7 wt %, for example, or 1 to 5 wt % based on a total amount of the resin composition. The resin composition including the rubber modified vinyl-based graft copolymer resin within the ranges exhibits excellent impact resistance and heat resistance.

Conductive Additive

The resin composition according to an embodiment includes the conductive additive. The conductive additive improves conductivity of the resin composition, and the resin composition may impart conductivity without decreasing inherent mechanical properties, flame retardancy, and the like. The conductive additive according to an embodiment includes a carbon fiber and a carbon nanotube (CNT).

For example, the carbon fiber and the carbon nanotube may be included in a weight ratio of 1:0.1 to 1:0.4, and for example, the carbon fiber and the carbon nanotube may be included in a weight ratio of 1:0.15, for example, 1:0.2, for example, 1:0.3. When the carbon fiber and the carbon nanotube are included in the ranges, conductivity of the resin composition may be significantly improved even at low amounts.

The carbon fiber according to an embodiment has excellent mechanical strength and may apply satisfactory conductivity to the resin composition. For example, the carbon fiber may be a cellulose fiber, a PAN-based carbon fiber using polyacrylonitrile (PAN) as a raw material, or a pitch-based carbon fiber obtained by baking pitch which is a hydrocarbon residue from petroleum or charcoal as a raw material but is not limited thereto.

For example, the carbon fiber may be a pitch-based carbon fiber having low volume resistivity ($10^{-2}$ to $10^{-3}$ Ohm·cm) and high electrical conductivity. For example, one strand of the carbon fiber may consist of 12,000 (12K) fibers, and in addition, the carbon fiber may be a chopped fiber having a length of 5 to 10 mm.

In addition, the carbon fiber may be included in an amount of 10 to 20 wt %, for example, 10 to 15 wt % based on a total amount of the resin composition. When the carbon fiber is included in an amount of less than 10 wt %, sufficient conductivity may not be easy to obtain, but when the amount is greater than 20 wt %, a drawback of deteriorating properties may occur.

In general, a carbon nanotube has mechanical characteristics such as high mechanical strength, a high modulus (Young's Modulus), and a large aspect ratio and thus high electrical conductivity and thermal stability. The carbon nanotube according to an embodiment is used in a small amount but along with the carbon fiber and thus may maintain impact resistance of the resin composition without deteriorating properties such as impact strength and the like as well as secure conductivity thereof.

The carbon nanotube may be applied without limitation as long as it is well known in the art. For example, it may include a single-walled carbon nanotube (SWNT), a double-walled carbon nanotube (DWNT), a multi-walled carbon nanotube (MWNT), a rope carbon nanotube, a combination thereof.

For example, the carbon nanotube may have an average diameter of 0.5 nm to 100 nm, for example, 1 nm to 50 nm, or for example, 1 nm to 20 nm. For example, the carbon nanotube may have an average length of 0.05 μm to 100 μm, for example, 1 μm to 50 μm.

The carbon nanotube may be included in an amount of 0.5 to 8 wt %, for example, 1 to 5 wt %, for example, 2 to 4 wt % based on a total amount of the resin composition. When the amount of the carbon nanotube is less than 0.5 wt %, it may be difficult to obtain sufficient conductivity and when the amount is greater than 5 wt %, it is not economical in terms of costs.

Talc

The resin composition according to an embodiment includes talc. By including the talc in the resin composition, the flame retardancy may be improved while maintaining low sheet resistance.

For example, the talc may be conventional talc having a particle shape such as a sheet shape, a needle shape, and the like.

The talc may be included in an amount of 1 to 10 wt % based on a total amount of the resin composition. For example, the talc may be included in an amount of 1 to 7 wt %, for example, 2 to 7 wt %, for example, 3 to 5 wt % based on a total amount of the resin composition.

Foaming Agent

The resin composition according to an embodiment includes the foaming agent. The resin composition includes the foaming agent and thus may further improve conductivity without deteriorating flame retardancy as well as minimize the amount of the carbon fiber and the carbon nanotube.

The foaming agent may be for example an inorganic foaming agent such as water, nitrogen, carbonate gas, and the like, a volatile organic foaming agent such as propane, butane, isobutane, pentane, cyclopentane, hexane, cyclohexane, dichloromethane, 1,2-dichloroethane, dimethylether, diethylether, ethylmethylether, and the like, a chemical foaming agent such as an azo compound, and the like, but is not limited thereto. The foaming agent may be used alone or in a mixture of two or more. For example, the foaming agent may be magnesium bicarbonate.

The foaming agent may be included in an amount of 0.5 to 5 parts by weight, for example, 0.5 to 3 parts by weight, for example, 0.5 to 1 parts by weight based on 100 parts by weight of the resin composition.

Phosphorus-Based Flame Retardant and Flame Retardant Auxiliary Agent

The resin composition according to an embodiment includes the phosphorus-based flame retardant. The phosphorus-based flame retardant may be a conventional phosphorus-based flame retardant used in a flame retardant resin composition. For example, the phosphorus-based flame retardant may be a phosphate compound, a phosphonate compound, a phosphinate compound, a phosphine oxide compound, a phosphazene compound, a metal salt thereof, and the like. The phosphorus-based flame retardant may be used alone or in a mixture of two or more.

For example, the phosphorus-based flame retardant may be a phosphoric acid ester compound represented by Chemical Formula 2 or a mixture thereof, but is not limited thereto.

[Chemical Formula 2]

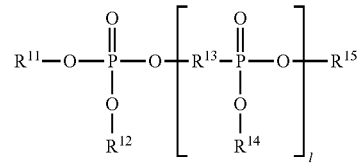

In Chemical Formula 2, $R^{11}$, $R^{12}$, $R^{14}$, and $R^{15}$ are independently hydrogen, a substituted or unsubstituted C6 to C20 aryl group, a substituted or unsubstituted C7 to C30 arylalkyl group, or a combination thereof, $R^{13}$ is a substituted or unsubstituted C6 to C20 arylene group or a substituted or unsubstituted C7 to C30 arylalkyl group, and l is an integer ranging from 0 to 4.

For example, when n is 0, examples of the phosphoric acid ester compound represented by Chemical Formula 2 may be diphenylphosphate, and the like diarylphosphate, triphenylphosphate, tricresyl phosphate, trixylenylphosphate, tri(2,6-dimethylphenyl)phosphate, tri(2,4,6-trimethylphenyl)phosphate, tri(2,4-ditertiarybutylphenyl)phosphate, tri(2,6-dimethylphenyl)phosphate, and the like, and when n is 1, it may be bisphenol-A bis(diphenylphosphate), resorcinol bis(diphenylphosphate), resorcinol bis[bis(2,6-dimethylphenyl)phosphate], resorcinol bis[bis(2,4-ditertiarybutylphenyl)phosphate], hydroquinone bis[bis(2,6-dimethylphenyl)phosphate], hydroquinone bis[bis(2,4-ditertiarybutylphenyl)phosphate], and the like, but is not limited thereto. In addition, the phosphoric acid ester-based compound may be used alone or in a mixture of two or more.

The phosphorus-based flame retardant may be included in an amount of 5 to 20 wt % based on a total amount of the resin composition. For example, the phosphorus-based flame retardant may be included in an amount of 5 to 18 wt %, for example, 5 to 15 wt %, for example, 10 to 15 weight % based on a total amount of the resin composition. The phosphorus-based flame retardant may improve flame retardancy without deteriorating other properties of the resin composition within the ranges.

The resin composition according to an embodiment may further include a flame retardant auxiliary agent in order to improve flame retardancy. For example, the flame retardant auxiliary agent may be a fluorine resin, for example, polytetrafluoroethylene, polyvinylidene fluoride, a copolymer of tetrafluoroethylene and vinylidenefluoride, and a copolymer of tetrafluoroethylene and hexafluoropropylene, and for example, the flame retardant auxiliary agent may be polytetrafluoroethylene.

The flame retardant auxiliary agent may be included in an amount of 0.2 to 2 parts by weight, for example, 0.2 to 1.5 parts by weight, 0.3 to 1 parts by weight based on 100 parts by weight of the resin composition. When the flame retardant auxiliary agent is included in an amount of less than 0.2 parts by weight, flame retardancy of the resin composition may be deteriorated, and when the flame retardant auxiliary agent is included in an amount of greater than 2.0 parts by weight, there may be a problem in terms of processability, and flowability and impact strength may be deteriorated.

The resin composition according to an embodiment may further include other additives such as an antioxidant, an ultraviolet (UV) stabilizer, a fluorescent whitening agent, a release agent, a nucleating agent, a lubricant, an antistatic agent, a stabilizer, a reinforcing material, a colorant such as a pigment or a dye, and the like. For example, the other additives may be included in an amount of 0.1 to 10 parts by weight based on 100 parts by weight of the resin composition, but are not limited thereto.

The resin composition may be prepared in a form of a pellet by mixing the constituting components and other additives simultaneously and then melt extruding the same in an extruder. The prepared pellet may be manufactured into various articles through various molding methods such as injection molding, extrusion molding, vacuum molding, casting molding, and the like.

A molded article according to an embodiment is produced from the resin composition. For example, the resin composition may be used to manufacture a molded article in a publicly-known molding method of injection molding, extrusion molding, and the like.

For example, the molded article may have sheet resistance of less than or equal to $10^5$ Ohm/sq, for example, $10^2$ to $10^5$ Ohm/sq, or for example, $10^3$ to $10^5$ Ohm/sq and flame retardancy of greater than or equal to V-1, for example, V-0 to V-1 according to a UL94 standard.

The molded article according to an embodiment has excellent mechanical properties such as electrical conductivity, flame retardancy, and the like and thus may be applied to electronics such as TV and the like.

Hereinafter, structures and functions of the present invention are illustrated in more detail with reference to preferable examples. However, these examples, however, are not in any sense to be interpreted as limiting the scope of the present invention.

EXAMPLES

Example 1 and Comparative Examples 1 to 7

The components used in Example 1 and Comparative Examples 1 to 7 are as follows.

(A) Polycarbonate (PC) resin: MI: 19±2 (300, 1.2 kg) (Manufacturer: Lotte Advanced Materials Co., Ltd.)

(B) Rubber-modified aromatic vinyl-based copolymer resin:

g-ABS obtained by graft-copolymerizing 52 wt % of a styrene monomer and acrylonitrile (a weight ratio (SM/AN): 73/27) into 48 wt % of a polybutadiene rubber (PBR, an average particle diameter (Z-average): 310 nm) was used.

(C) Carbon Fiber: Bulk density: 400, Black Chopped Fiber (Manufacturer: SGL)

(D) Carbon Nanotube: Bulk density: 0.025, Black Powder (Manufacturer: Hanwha Nano Tech Corp.)

(E) Talc: Bulk Density: 0.4 to 0.6, Moisture: Max 0.50 (Manufacturer: KOCH)

(F) Phosphorus-based Flame Retardant: Bisphenol-A Bis (diphenylphosphate) (BDP) (Manufacturer: Yoke)

(G) Foaming Agent: Magnesium Bicarbonate (Manufacturer: Reedy)

(H) Flame Retardant Auxiliary Agent: Teflon, Powder (Manufacturer: General chemical corporation)

The resin compositions of according to Example 1 and Comparative Examples 1 to 7, which were prepared according to each composition and amount shown in Table 1, were respectively put in a twin screw type extruder having L/D=44 and a diameter 45 mm and then, melt and extruded at 250° C. and a stirring speed of 200 rpm condition to manufacture pellets. The pellets were dried at 80° C. for greater than or equal to 5 hours and ejected through a screw type injector (150 ton single injector) at 240° C. to 280° C. to manufacture specimens.

TABLE 1

|  | Ex. 1 | Comp. Ex. 1 | Comp. Ex. 2 | Comp. Ex. 3 | Comp. Ex. 4 | Comp. Ex. 5 | Comp. Ex. 6 | Comp. Ex. 7 |
| --- | --- | --- | --- | --- | --- | --- | --- | --- |
| (A) Polycarbonate resin (wt %) | 65 | 65 | 60 | 63 | 77 | 65 | 65 | 70 |
| (B) g-ABS (wt %) | 5 | 5 | 5 | 5 | 5 | 5 | 5 | 5 |

TABLE 1-continued

|  | Ex. 1 | Comp. Ex. 1 | Comp. Ex. 2 | Comp. Ex. 3 | Comp. Ex. 4 | Comp. Ex. 5 | Comp. Ex. 6 | Comp. Ex. 7 |
| --- | --- | --- | --- | --- | --- | --- | --- | --- |
| (C) Carbon fiber (wt %) | 10 | 10 | 15 | 10 | 0 | 12 | 0 | 10 |
| (D) CNT (wt %) | 2 | 2 | 2 | 4 | 0 | 0 | 12 | 2 |
| (E) Talc (wt %) | 5 | 5 | 5 | 5 | 5 | 5 | 5 | 0 |
| (F) BDP (wt %) | 13 | 13 | 13 | 13 | 13 | 13 | 13 | 13 |
| (G) Foaming agent (parts by weight) | 1.0 | 0 | 0 | 0 | 0 | 0 | 0 | 1.0 |
| (H) Teflon (parts by weight) | 0.5 | 0.5 | 0.5 | 0.5 | 0.5 | 0.5 | 0.5 | 0.5 |

(parts by weight: a part by weight based on 100 parts by weight of resin composition including (A) to (F))

Evaluation

The specimens according to Example 1 and Comparative Examples 1 to 7 were evaluated regarding properties in the following method, and the results are shown in Table 2.

(1) Sheet Resistance (ohm/sq): measured with four point probes at an equal distance. The four point probes are disposed at a distance of 1 mm in a row to measure a current (I) and a voltage (V), which were used to obtain resistance and then, apply a correction factor (C.F) thereto to obtain a sheet resistance unit of ohm/sq according to Equation 1.

$$V/I = \text{ohm}(\text{Ohm} \times C.F = \text{ohm/sq})$$ Equation 1

(2) Flame Retardancy: measured by manufacturing a 2.0 mm-thick specimen according to UL-94 VB flame retardancy regulations.

TABLE 2

|  | Ex. 1 | Comp. Ex. 1 | Comp. Ex. 2 | Comp. Ex. 3 | Comp. Ex. 4 | Comp. Ex. 5 | Comp. Ex. 6 | Comp. Ex. 7 |
| --- | --- | --- | --- | --- | --- | --- | --- | --- |
| Sheet resistance (Ohm/sq) | $10^4$ | $10^7$ | $10^4$ | $10^5$ | $10^{12}$ | $10^8$ | $10^4$ | $10^7$ |
| Flame retardancy (UL94, 2.0 mm) | V-1 | V-1 | Fail | Fail | V-0 | V-1 | Fail | V-1 |

Referring to Table 2, the resin composition according to Example 1 exhibited excellent electrical conductivity as well as maintained flame retardancy of a V-1 rank.

On the other hand, the results of Comparative Examples 1 to 3 exhibited that as an amount of the carbon nanotube relative to that of the carbon fiber was increased, electrical conductivity was improved, but flame retardancy was deteriorated. In addition, Comparative Example 7 including a foaming agent but no talc exhibited high sheet resistance and thus deteriorated electrical conductivity.

In other words, a resin composition according to an embodiment includes a carbon fiber and a carbon nanotube as a conductive additive in an appropriate content ratio and in addition, a foaming agent and talc and thus has excellent electrical conductivity without deteriorating flame retardancy.

The present invention is not limited to the exemplary embodiment and may be embodied in various modifications, and it will be understood by a person of ordinary skill in the art to which the present invention pertains that the present invention may be carried out through other specific embodiments without modifying the technical idea or essential characteristics thereof. Therefore, the aforementioned embodiments should be understood to be exemplary but not limiting the present invention in any way.

The invention claimed is:

1. A resin composition, comprising:
   a base resin comprising:
      a polycarbonate resin;
      a rubber-modified aromatic vinyl-based copolymer resin;
      a conductive additive comprising a carbon fiber and a carbon nanotube;
   talc; and
   optionally a phosphorus-based flame retardant; and
   a foaming agent, wherein a weight ratio of the carbon fiber and the carbon nanotube is 1:0.2 to 1:0.4.

2. The resin composition of claim 1, comprising the foaming agent in an amount of 0.5 to 5 parts by weight based on 100 parts by weight of the base resin composition.

3. The resin composition of claim 1, comprising 1 to 10 wt % of talc based on 100 wt % of the base resin composition.

4. The resin composition of claim 1, wherein the resin composition comprises the phosphorus-based flame retardant and a flame retardant auxiliary agent.

5. The resin composition of claim 4, comprising the phosphorus-based flame retardant in an amount of 5 to 20 wt % based on 100 wt % of the base resin composition.

6. The resin composition of claim 4, wherein the flame retardant auxiliary agent is polytetrafluoroethylene.

7. The resin composition of claim 4, comprising the flame retardant auxiliary agent in an amount of 0.2 to 2 parts by weight based on 100 parts by weight of the base resin composition.

8. A molded article produced from the resin composition of claim 1.

9. The molded article of claim 8, wherein the molded article has a sheet resistance of less than or equal to $10^5$ Ohm/sq.

10. The molded article of claim 8, wherein the molded article has flame retardancy of greater than or equal to V-1 according to UL94 standard.

\* \* \* \* \*